(12) United States Patent
Dou et al.

(10) Patent No.: US 12,100,133 B2
(45) Date of Patent: Sep. 24, 2024

(54) IMAGE EVALUATION APPARATUS AND IMAGE EVALUATION METHOD

(71) Applicant: Hitachi High-Tech Corporation, Tokyo (JP)

(72) Inventors: Shuyang Dou, Tokyo (JP); Yasutaka Toyoda, Tokyo (JP); Fumihiro Bekku, Tokyo (JP); Takefumi Kakinuma, Tokyo (JP); Shinichi Shinoda, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 321 days.

(21) Appl. No.: 17/418,345

(22) PCT Filed: Oct. 11, 2019

(86) PCT No.: PCT/JP2019/040208
§ 371 (c)(1),
(2) Date: Jun. 25, 2021

(87) PCT Pub. No.: WO2020/152925
PCT Pub. Date: Jul. 30, 2020

(65) Prior Publication Data
US 2022/0067902 A1 Mar. 3, 2022

(30) Foreign Application Priority Data
Jan. 22, 2019 (JP) .................................. 2019-008386

(51) Int. Cl.
*G06T 7/00* (2017.01)
*G06F 18/21* (2023.01)
(Continued)

(52) U.S. Cl.
CPC ............ *G06T 7/001* (2013.01); *G06F 18/214* (2023.01); *G06F 18/217* (2023.01); *G06F 18/24* (2023.01);
(Continued)

(58) Field of Classification Search
CPC ........... G06T 7/001; G06T 2207/30148; G06T 2207/20081; G06T 2207/0061;
(Continued)

(56) References Cited

U.S. PATENT DOCUMENTS 10,810,733 B2    10/2020   Naoaki et al.
11,176,650 B2 *  11/2021   Kurita .............. G06V 30/19173
(Continued)

FOREIGN PATENT DOCUMENTS

CN    101093520 A    12/2007
CN    103748670 A     4/2014
(Continued)

OTHER PUBLICATIONS

International Search Report (PCT/ISA/210) issued in PCT Application No. PCT/JP2019/040208 dated Dec. 24, 2019 with English translation (three (3) pages).
(Continued)

*Primary Examiner* — Hoa Q Pham
(74) *Attorney, Agent, or Firm* — Crowell & Moring LLP

(57) ABSTRACT

The purpose of the present invention is to provide an image evaluation device and method which can detect unknown defects and which can prevent misrecognition by a machine learning model. This image evaluation device, which uses a machine learning classifier to classify defect information in a defect image of an electronic device, is characterized by being provided with: an image storage unit which stores a defect image of an electronic device; a defect region storage unit which stores defect region information that is in the
(Continued)

defect image; a classifier which classifies the defect information with machine learning; an image extraction unit which, in the course of the defect image classification processing, extracts image-of-interest information which the classifier will focus on; and an evaluation unit which compares the image-of-interest information and the defect region information to evaluate the classifiability of the defect image.

16 Claims, 8 Drawing Sheets

(51) Int. Cl.
    *G06F 18/214*     (2023.01)
    *G06F 18/24*     (2023.01)
    *G06N 20/00*     (2019.01)
    *G06V 10/25*     (2022.01)

(52) U.S. Cl.
    CPC .............. *G06N 20/00* (2019.01); *G06V 10/25* (2022.01); *G06T 2207/20081* (2013.01); *G06T 2207/30148* (2013.01)

(58) Field of Classification Search
    CPC .. G06K 9/6267; G06K 9/6256; G06K 9/3233; G06K 9/6262; G06K 9/627; G06N 20/00; G06N 3/08; H01L 22/20; H01L 21/67288; G01N 21/9501; G01N 21/95607
    See application file for complete search history.

(56) References Cited

U.S. PATENT DOCUMENTS

| | | |
|---|---|---|
| 2008/0016481 A1 | 1/2008 | Matsuoka et al. |
| 2014/0198975 A1 | 7/2014 | Ryo et al. |
| 2018/0174000 A1 | 6/2018 | Takagi et al. |
| 2019/0139210 A1* | 5/2019 | Kondo ................. G06V 10/772 |
| 2019/0188840 A1* | 6/2019 | Kwon .................. G06V 10/764 |

FOREIGN PATENT DOCUMENTS

| | | |
|---|---|---|
| CN | 106290378 A | 1/2017 |
| CN | 106875381 A | 6/2017 |
| JP | 2000-57349 A | 2/2000 |
| JP | 2000-200356 A | 7/2000 |
| JP | 2001-256480 A | 9/2001 |
| JP | 2005-34211 A | 2/2005 |
| JP | 2013140468 A * | 7/2013 |
| KR | 10-2017-0141255 A | 12/2017 |
| TW | 201741651 A | 12/2017 |
| TW | 201809640 A | 3/2018 |

OTHER PUBLICATIONS

Japanese-language Written Opinion (PCT/ISA/237) issued in PCT Application No. PCT/JP2019/040208 dated Dec. 24, 2019 (three (3) pages).

Zhou et al., "Learning Deep Features for Discriminative Localization", Computer Vision Foundation, 2016, pp. 2921-2929, (nine (9)s pages).

Nguyen et al., "Deep Neural Networks are Easily Fooled: High Confidence Predictions for Unrecognizable Images", Computer Vision Foundation, 2015, pp. 427-436, (10 pages).

Chinese-language Office Action issued in Taiwanese Application No. 108136854 dated Oct. 7, 2020 with English translation (24 pages).

Chinese-language Office Action issued in Chinese Application No. 201980077432.3 dated Jan. 3, 2024 with English translation (18 pages).

* cited by examiner

IMAGE EVALUATION APPARATUS AND IMAGE EVALUATION METHOD

TECHNICAL FIELD

The present invention relates to an image evaluation apparatus and image evaluation method based on a comparison between a region of interest of a machine learning model in a defect image and position information of a defect object.

BACKGROUND ART

In recent years, in the field of semiconductor inspection and the like, an image analysis technique of discriminating an object by extracting feature values from an image and comparing and collating it with information registered in advance in a database or the like has been used.

The technique described in PTL 1 is known as an example of such image analysis technique. According to PTL 1, an output image in which a specific pattern is emphasized can be output from an input image by applying a machine learning means.

A neural network and support vector machine are known as a specific machine learning algorithm of a machine learning means for discriminating an object. However, any method varies greatly in classification accuracy depending on what kind of feature values, and hence the selection method of the feature values has become important.

In this regard, in recent years, a deep learning method called a convolutional neural network (CNN) has been developed and is attracting attention. CNN is a kind of machine learner in which a deep learning model automatically learns features of an image, and performs extraction of an object image included in the image, discrimination of the object, classification of the image, and the like.

According to CNN, it is possible to automatically extract, from the learning data, the selection of the feature values required in machine learning such as a conventional support vector machine, and it exhibits very high image analysis performance.

CITATION LIST

Patent Literature

PTL 1: JP 2005-34211 A

SUMMARY OF INVENTION

Technical Problem

Thus, CNN has a high recognition performance, but on the other hand, it also strongly reacts to an image of an unknown type other than a learned type, and includes a problem of frequent misrecognition with a high degree of certainty.

Specifically, for example, when CNN is applied to a semiconductor manufacturing line, the occurrence frequency of some defects found in the semiconductor manufacturing line is low. Therefore, it is difficult to collect a large amounts of defects and cause CNN to perform learning.

For this reason, there is a problem of a risk of overlooking an unknown defect not included in the training data.

Thus, in a case where machine learning is utilized in image inspection of a semiconductor, there is a risk of strongly reacting to a defect image of an unknown type in which a learned model is not included in the training data, and misrecognizing with a high degree of certainty. This can lead to an overlooked fatal defect and reduction in yield. Therefore, a means for detecting an unknown defect is required.

Accordingly, an object of the present invention is to provide an image evaluation apparatus and method capable of detecting an unknown defect and capable of preventing misrecognition by a machine learning model.

Solution to Problem

Accordingly, the present invention is "an image evaluation apparatus that classifies defect information in a defect image of an electronic device by using a classifier by machine learning, the image evaluation apparatus including: an image storage unit that stores a defect image of the electronic device; a defect region storage unit that stores defect region information in the defect image; a classifier that classifies defect information by machine learning; an image extraction unit that extracts image-of-interest information the classifier focuses on in a process of classification processing of the defect image; and an evaluation unit that evaluates classifiability of the defect image by comparing the image-of-interest information with the defect region information".

The present invention is "an image evaluation apparatus classifying defect information in a defect image of an electronic device by using a plurality of classifiers by machine learning, the image evaluation apparatus, including: an image storage unit storing a defect image of the electronic device; a plurality of classifiers classifying defect information by machine learning; an image extraction unit extracting a plurality of pieces of image-of-interest information the plurality of classifiers focus on in a process of classification processing of the defect image; and an evaluation unit evaluating the plurality of classifiers by comparing the plurality of pieces of image-of-interest information".

The present invention is "an image evaluation method of classifying defect information in a defect image of an electronic device by using a classifier by machine learning, the image evaluation method, including: storing a defect image of the electronic device; storing defect region information in the defect image; extracting image-of-interest information the classifier focuses on in a process of classification processing of the defect image; and evaluating classifiability of the defect image by comparing the image-of-interest information with the defect region information".

The present invention is "an image evaluation method of classifying defect region information in a defect image of an electronic device by using a plurality of classifiers by machine learning, the image evaluation method, including: storing a defect image of the electronic device; extracting a plurality of pieces of image information the plurality of classifiers focus on in a process of classification processing of the defect image; and evaluating the plurality of classifiers by comparing the plurality of pieces of image-of-interest information".

Advantageous Effects of Invention

According to the present invention, it is possible to detect an unknown defect and to prevent misrecognition by a machine learning model.

DESCRIPTION OF EMBODIMENTS

Embodiments of the present invention will be described below in detail with reference to the drawings.

While the image evaluation apparatus of the present invention is applicable to a wide range of technical fields in which images are handled, the following embodiments of the present invention exemplify an image evaluation apparatus and method for preventing misrecognition of an unknown defect in semiconductor inspection utilizing machine learning. As a specific example, an example of detecting an unknown defect using a learned machine learning model and region information of a defect object is shown.

Therefore, in the present description, first, a technique as a premise of semiconductor inspection will be described with reference to FIGS. 10 and 11, and then, the embodiments will be described with reference to FIGS. 1 to 9.

A device and a measurement inspection system including an unknown defect detection function in semiconductor inspection utilizing machine learning will be described below with reference to FIGS. 10 and 11. More specifically, an apparatus and system including a critical dimension-scanning electron microscope (hereinafter referred to as CD-SEM or simply SEM), which is a type of measurement device, will be described.

In the following description, a charged particle radiation device is exemplified as a device that forms an image, and an example using an SEM is described as its embodiment. However, the present invention is not limited thereto, and for example, a focused ion beam (hereinafter referred to as FIB) device that scans an ion beam on a sample to form an image may be employed as the charged particle radiation device. However, since an extremely high magnification is required for highly accurate measurement of a pattern in which die shrink progresses, it is generally desirable to use an SEM that is superior to an FIB device in terms of resolution.

Figure 10:
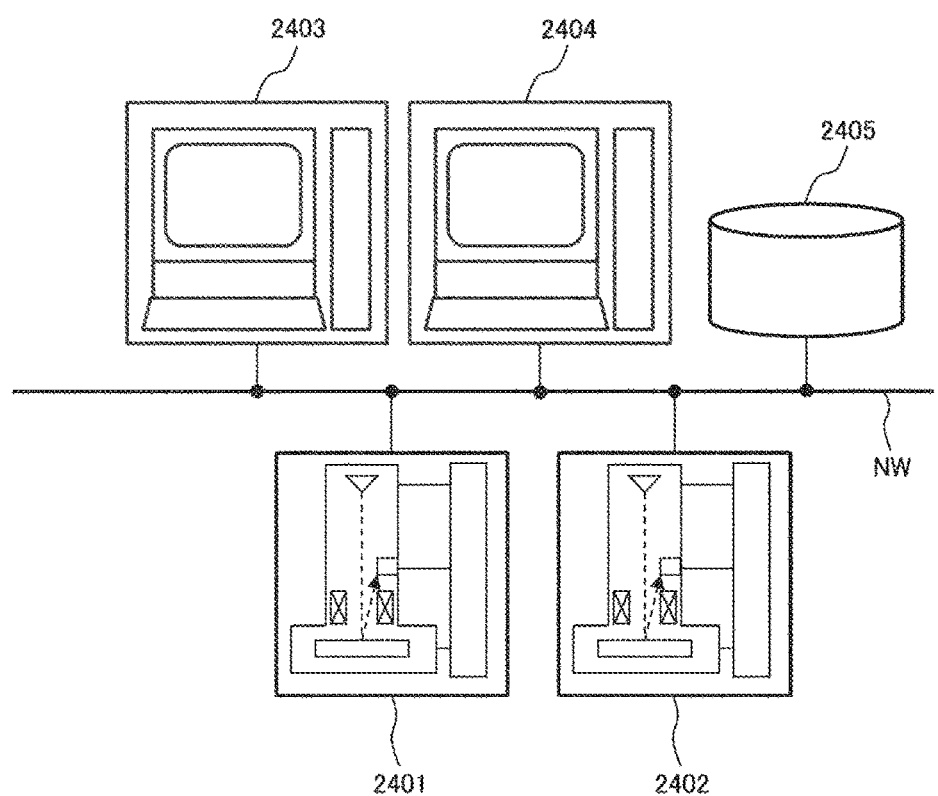
FIG. 10 is a view explaining an example of a semiconductor inspection system.

FIG. 10 is a schematic explanatory view of a semiconductor inspection system in which a plurality of measurement or inspection devices are connected to a network. The system has a configuration in which a CD-SEM 2401 mainly measuring a pattern dimension of a semiconductor wafer, a photomask, and the like, and a defect inspection device 2402 acquiring an image by irradiating a sample with an electron beam and extracting a defect based on comparison between the image and a previously registered reference image are connected to a network NW.

The network NW is connected with a condition setting device 2403 setting a measurement position, a measurement condition, and the like on the design data of the semiconductor device, a simulator 2404 simulating the results of a pattern based on the design data of the semiconductor device and the manufacturing conditions of the semiconductor manufacturing device, and a storage medium 2405 that stores the layout data of the semiconductor device and the design data in which the manufacturing conditions are registered.

The design data is expressed in, for example, GDS format or OASIS format, and stored in a predetermined format. The design data may have any type as long as software for displaying the design data can display the format and can handle it as graphic data. The storage medium 2405 may be incorporated in a measurement device, a control device of the inspection device, the condition setting device 2403, or the simulator 2404.

The CD-SEM 2401 and the defect inspection device 2402 include respective control devices to perform control necessary for the respective devices. These control devices may be equipped with the function of the simulator and the setting function of measurement conditions.

In the SEM, an electron beam emitted from an electron source is focused by a multi-stage lens, and the focused electron beam is scanned one-dimensionally or two-dimensionally on a sample by a scanning deflector.

Secondary electrons (hereinafter referred to as SE) or backscattered electrons (hereinafter referred to as BSE) emitted from the sample by scanning of the electron beam are detected by a detector and stored in a storage medium such as a frame memory in synchronization with the scanning of the scanning deflector. The image signal stored in the frame memory is integrated by an arithmetic device equipped in the control device. Scanning by the scanning deflector is possible for any size, position, and direction.

The control and the like described above are performed by the control device of each SEM, and images and signals obtained as a result of scanning of the electron beam are sent to the condition setting device 2403 via the network NW. In this example, the control device controlling the SEM and the condition setting device 2403 are described as separate devices, but the present invention is not limited to this, and the condition setting device 2403 may collectively perform the control of the devices and measurement processing, or each control device may perform the SEM control and measurement processing together.

A program for executing the measurement processing is stored in the condition setting device 2403 or the control device, and measurement or calculation is performed in accordance with the program.

The condition setting device 2403 includes a function of creating, based on the design data of the semiconductor, a program (recipe) controlling the operation of the SEM, and functions as a recipe setting unit. Specifically, the condition setting device 2403 sets the position and the like for performing processing necessary for SEM such as a desired measurement point, autofocus, automatic stigma, and addressing point on design data, contour line data of a pattern, or simulated design data, and based on the setting, creates a program for automatically controlling a sample stage of SEM, a deflector, and the like.

Figure 11:
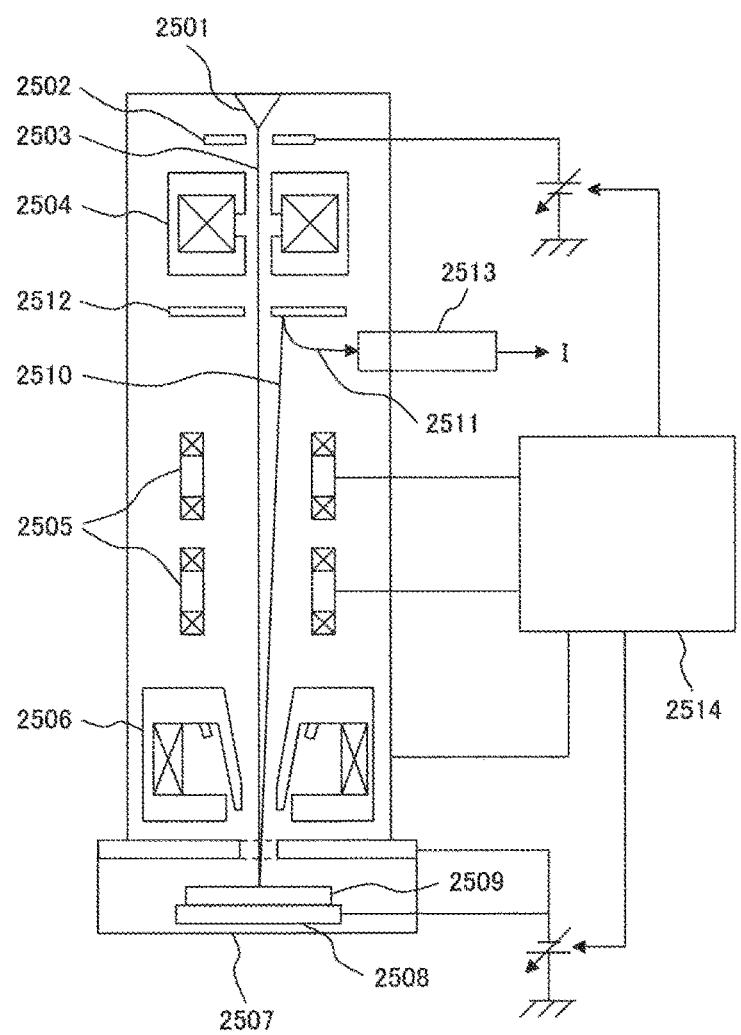
FIG. 11 is a schematic explanatory view of a scanning electron microscope.

FIG. 11 is a schematic configuration view of a scanning electron microscope. An electron beam 2503 extracted by an extraction electrode 2502 from an electron source 2501 and accelerated by an acceleration electrode not illustrated is focused by a condenser lens 2504, which is a form of focusing lens, and then scanned one-dimensionally or two-dimensionally on a sample 2509 by a scanning deflector 2505. The electron beam 2503 is decelerated by a negative voltage applied to an electrode incorporated in a sample stage 2508, and focused by a lens action of an objective lens 2506 and irradiated on the sample 2509.

When the electron beam 2503 is irradiated onto the sample 2509, electrons 2510 such as secondary electrons and backscattered electrons are emitted from the irradiated portion. The emitted electrons 2510 are accelerated in the electron source direction by an acceleration action based on the negative voltage applied to the sample, collide with a conversion electrode 2512, and generate secondary electrons 2511.

The secondary electrons 2511 emitted from the conversion electrode 2512 are captured by a detector 2513, and an output I of the detector 2513 changes depending on the amount of the captured secondary electrons. The luminance of a display device not illustrated changes according to the output I. For example, in a case of forming a two-dimensional image, an image of the scanning region is formed by synchronizing a deflection signal to the scanning deflector 2505 with the output I of the detector 2513. The scanning electron microscope exemplified in FIG. 11 includes a deflector not illustrated that moves the scanning region of the electron beam.

In the example shown in FIG. 11, an example in which electrons emitted from the sample are detected by one end conversion with the conversion electrode is described, but of course the present invention is not limited to such a configuration, and it is possible to have a configuration in which a detection surface of an electron-multiplier tube or a detector is arranged on an orbit of accelerated electrons, for example. A control device 2514 includes a function of controlling each configuration of the scanning electron microscope and forming an image based on the detected electrons and a function of measuring the pattern width of a pattern formed on the sample based on the intensity distribution of the detected electrons called a line profile.

First Embodiment

Figure 1:
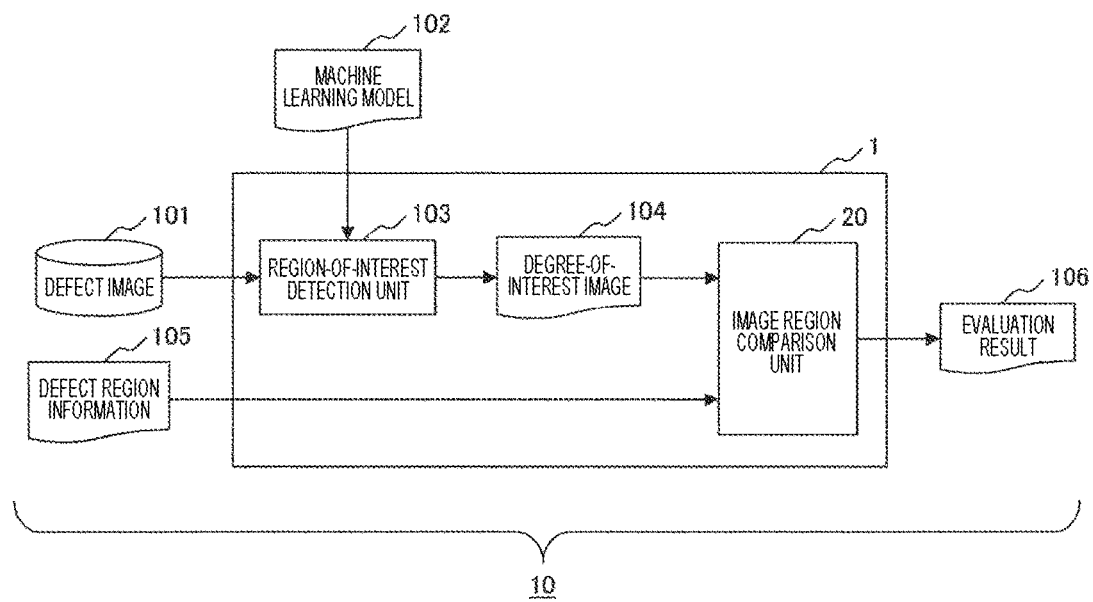
FIG. 1 is a view showing an embodiment of an image evaluation apparatus including an image evaluation unit.

The image evaluation apparatus and image evaluation method according to the first embodiment of the present invention show a case of being applied to the semiconductor inspection device described above, and an embodiment of the image evaluation apparatus including a function of detecting an unknown defect is shown in FIG. 1.

FIG. 1 is a view showing an embodiment of an image evaluation apparatus 10 including an image evaluation unit 1. The image evaluation unit 1 obtains an evaluation result 106 by referring to a machine learning model 102 with a defect image 101 and defect region information 105 as input.

The image evaluation apparatus 10 is configured in a software manner by using a computer system. A schematically presented intermediate product generated by the internal processing function or in the processing process of the image evaluation unit 1 indicates that the image evaluation apparatus 10 includes a region-of-interest detection unit 103, a degree-of-interest image 104 having been detected, and an image region comparison unit 20.

Specifically, in the image evaluation unit 1, the defect image 101 and the machine learning model 102 are input to the image evaluation unit 1, and the region-of-interest detection unit 103 generates, as the degree-of-interest image 104, region information the machine learning model 102 focuses on in the image. The image region comparison unit 20 compares the generated degree-of-interest image 104 with the defect region information 105, and outputs an evaluation result 106.

It is possible to incorporate the image evaluation unit 1 into the control device 2514 or it is possible for the incorporated arithmetic unit to execute image processing. It is possible for an external arithmetic unit (for example, the condition setting device 2403 exemplified in FIG. 10) to execute image evaluation via the network.

FIG. 1 and other figures do not clearly illustrate data as input, data as intermediate product, or data as a final product. However, it is needless to say that they are stored in a storage unit in some form.

The region-of-interest detection unit 103 generates an image feature value map by using parameters of the machine learning model 102 for the defect image 101. For implementing the function of the region-of-interest detection unit 103, it is preferable to use the literature "Zhou, Bolei, et al. "Learning deep features for discriminative localization", Proceedings of the IEEE Conference on Computer Vision and Pattern Recognition, 2016".

This Zhou literature is related to visualization of a region of interest in an image by CNN. CNN calculates a weighted sum of a plurality of feature value maps extracted from the image and output it as a pixel-by-pixel degree-of-interest image. Specifically, the weighted sum of the feature value maps is calculated using the weight of the neuron connected to these feature value maps, and the result of resizing to the size of the original image is output as the degree-of-interest image 104.

Thus, the degree-of-interest image 104 includes information regarding the degree of interest at each pixel of the defect image 101. The degree of interest at a region where the machine learning model 102 reacts strongly is high, and the degree of interest at a region where the machine learning model 102 reacts weakly is low. Using the degree-of-interest image 104, it is possible to explain the region of interest on which the recognition result generated by the machine learning model 102 is based.

On the other hand, the defect region information 105, which is another input in the image region comparison unit 20, includes the position information of the defect object in the image. For example, the defect region information 105 may be a rectangular region surrounding the defect object, or may be a mask image along the edge of the defect object. The defect region information 105 may be generated by the engineer visually checking the defect image and manually drawing, or may be generated by the defect region information may be generated by a defect detection unit 30 described later.

Figure 2:
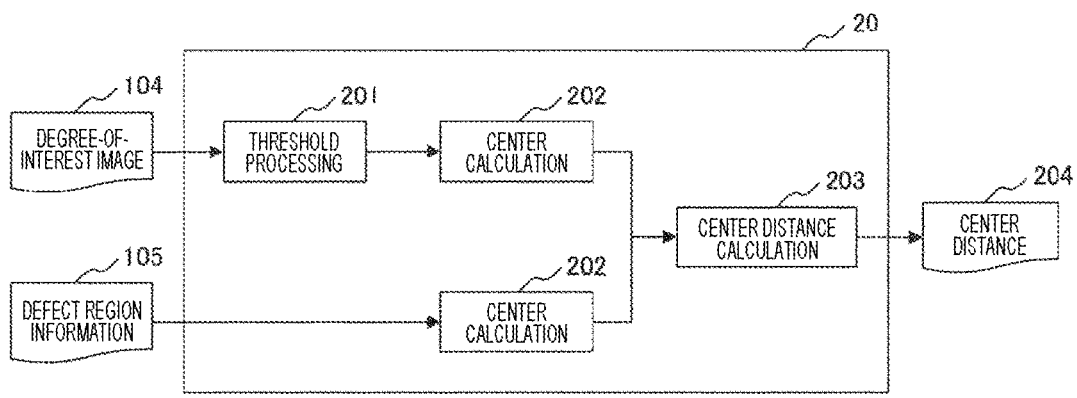
FIG. 2 is a view showing an embodiment of an image region comparison unit by center point comparison.

FIG. 2 is a view showing an example of the image region comparison unit 20. Threshold value processing 201 is performed on the degree-of-interest image 104. For example, only pixels whose degree of interest is larger than a certain threshold are extracted. Then, the center point of the extracted pixels is calculated by center calculation 202. Similarly, the center point is calculated from the defect region information 105. Using the two center points having been calculated, a distance between the two center points is calculated by center distance calculation 203, and a center distance 204 is output.

In the center calculation 202, a mean value of each pixel to be calculated may be calculated, or a weighted sum may be calculated. Examples of weights include the degree of interest of the corresponding pixel or the certainty that the corresponding pixel becomes defective.

Regarding the obtained center distance, if the defect type of the defect image 101 is a type included in the training data, the machine learning model 102 recognizes the same type of defect object and focuses on its region, and hence it can be said that the value of the center distance 204 calculated by the image region comparison unit 20 is small. On the other hand, in the case of an unknown defect not included in the training data regarding the obtained center distance, the deviation between the region the machine learning model 102 focuses on and the defect region is large, and hence it can be said that the value of the center distance 204 is large. Because of the tendency regarding the center distance, the center distance 204 can be used as it is as the evaluation result 106 of the image evaluation apparatus 1. Alternatively, the comparison result between the center distance 204 and a certain threshold value (e.g., OK and failure) can be output as the evaluation result 106.

FIG. 2 shows a determination method of the image region comparison unit 20, in which a known defect of a type included in the training data and an unknown defect not included in the training data are classified by using the different occurring in the center distance (center point) between them.

Figure 3:
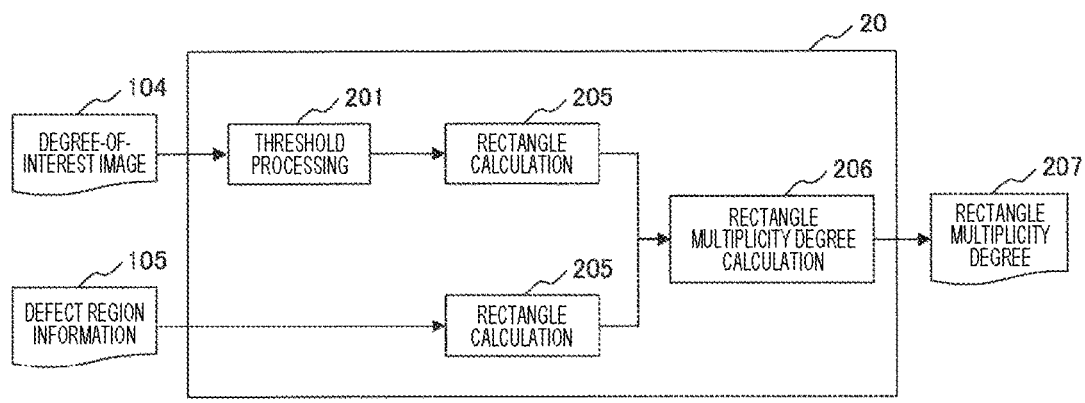
FIG. 3 is a view showing an embodiment of the image region comparison unit by rectangular region comparison.

In contrast to the image region comparison by the center point comparison in FIG. 2, FIG. 3, which is another first embodiment, shows image region comparison by rectangular region comparison. In FIG. 3, the center calculation in the image region comparison unit 20 of FIG. 2 is replaced with a rectangle calculation.

Rectangle calculation 205 of FIG. 3 estimates a rectangle including a target image region (region of interest or defect region). Using the two rectangles having been estimated, rectangle multiplicity degree calculation 206 calculates a rectangle multiplicity degree 207. An example of the rectangle multiplicity degree 207 includes the ratio of the overlap region to the total region. Since this rectangle multiplicity degree 207 can be used as an index of unknown defect determination similarly to the center distance 204 in FIG. 2, the rectangle multiplicity degree 207 may be output as it is as the evaluation result 106, or the result of comparison with the threshold may be output as the evaluation result 106.

The above description regarding the first embodiment has presented an embodiment of the image region comparison unit 20 by comparing the center points or comparing the rectangles. Other methods than this are also possible such as comparison of irregular regions, comparison of region areas, comparison of region shapes, and comparison of representative points (e.g., the maximum value of degree of interest shall be the representative point). There may also be a method of combining a plurality of comparison methods.

The evaluation result 106 finally obtained by the processing of FIGS. 1, 2, and 3 includes one or a plurality of indices output by the image region comparison unit 20 and a result calculated from the indices (e.g., a result determined as an unknown defect when the value of an index exceeds a certain threshold value).

Figure 8:
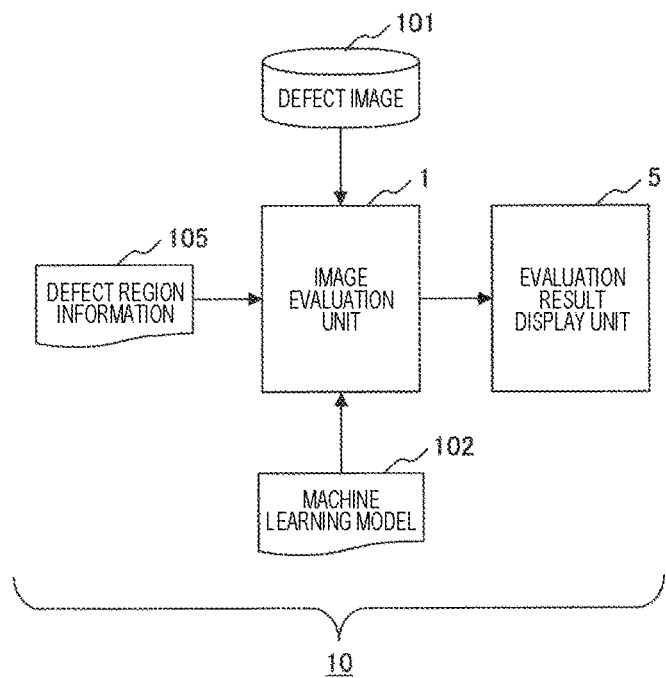
FIG. 8 is a view showing an embodiment of the image evaluation apparatus including an evaluation result display unit.

FIG. 8 is a view showing a configuration example in a case where the image evaluation apparatus 10 of FIG. 1 is configured to further include an evaluation result display unit 5. It is desirable that the evaluation result display unit 5 perform image display in a format as exemplified in FIG. 9.

Figure 9:
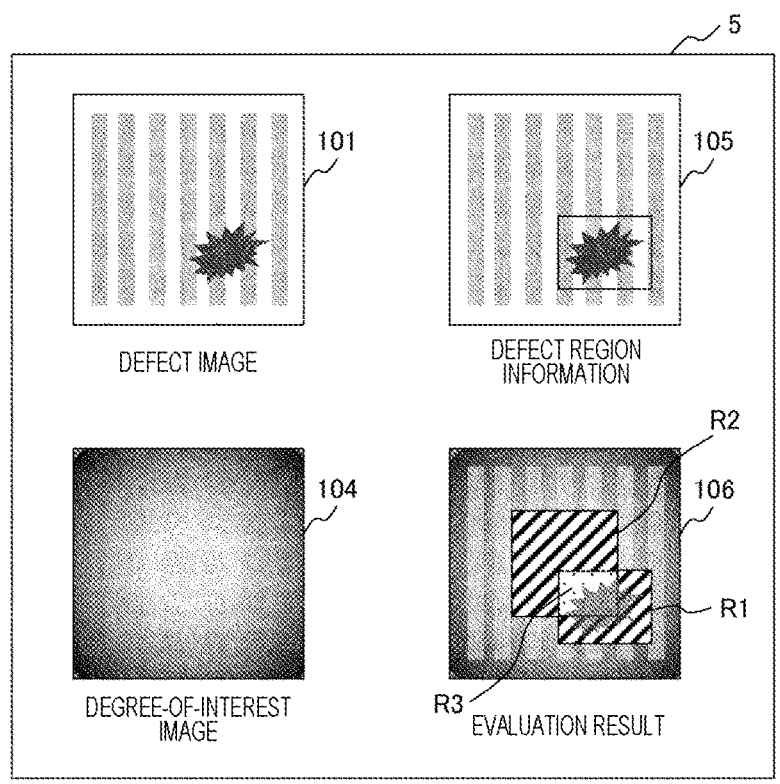
FIG. 9 is a view showing a display example in the evaluation result display unit.

According to the evaluation result display example in FIG. 9, the defect image 101, the defect region information 105, the degree-of-interest image 104, and the evaluation result 106 in which these images overlap are displayed on the display screen of the evaluation result display unit 5.

In this case, in the evaluation result 106, a hatched region R1 is a defect region, a hatched region R2 is a region of interest detected from the degree-of-interest image, and a region R3 is a region in which the both overlap. If the region R3 is small, it means that the amount of deviation between the region of interest of the machine learning model 102 and the defect region information 105 is large, and it can be said that there is a large possibility that the defect image 101 is an unknown defect. Using the evaluation result display unit 5 shown in FIG. 9, the user can understand the evaluation result 106 more deeply.

In a case where the above display indicates in advance that the region of interest of the machine learning model 102 is correct, and the defect region information 105 has been made visually by the engineer, the difference between the defect region marked by the engineer and the true value is known from the evaluation result 106. Therefore, it is conceivable that this image evaluation apparatus is utilized also for education and ability determination of engineers.

Thus, it is possible to realize the image evaluation apparatus including the image evaluation unit 1.

The image evaluation apparatus 10 according to the present invention relates to, in short, an apparatus that evaluates an unknown defect image by using a machine learning model and defect region information, and determines whether or not classification is possible, and is configured as "an image evaluation apparatus that classifies defect information (type, position, and the like) in a defect image of an electronic device by using a classifier 102 by machine learning, the image evaluation apparatus including: an image storage unit that stores the defect image 101 of the electronic device; the defect region storage unit that stores the defect region information 105 in the defect image; the classifier 102 that classifies defect information by machine learning; an image extraction unit 103 that extracts image-of-interest information 104 the classifier focuses on in a process of classification processing of the defect image; and an image evaluation unit 20 that evaluates classifiability of the defect image by comparing the image-of-interest information with the defect region information".

The image evaluation apparatus 10 according to the present invention is configured so that "the image evaluation unit 20 (201, 202, 203) calculates one or more coordinates of interest from an image region the machine learning classifier 102 focuses on, calculates one or more defect coordinates from the defect region information, compares distances between coordinates, and evaluates classifiability of the defect image" as an example of the processing.

The image evaluation apparatus 10 according to the present invention is configured so that "the image evaluation unit 20 (201, 202, 203) calculates a representative area of interest from an image region the machine learning classifier focuses on, calculates a defect area from the defect region information, calculates multiplicity between areas, and evaluates classifiability of the defect image" as an example of the processing.

The image evaluation apparatus 10 according to the present invention includes an image display unit (evaluation result display unit 5) that displays the evaluation result 106 of the image evaluation unit (image region comparison unit 20), and the image display unit displays at least one or more of defect region information in the defect image, a normal image corresponding to the defect image, and design data corresponding to the defect image.

Second Embodiment

The first embodiment represented by FIG. 1 assumes that the defect region information 105 has been obtained by some method.

Figure 4:
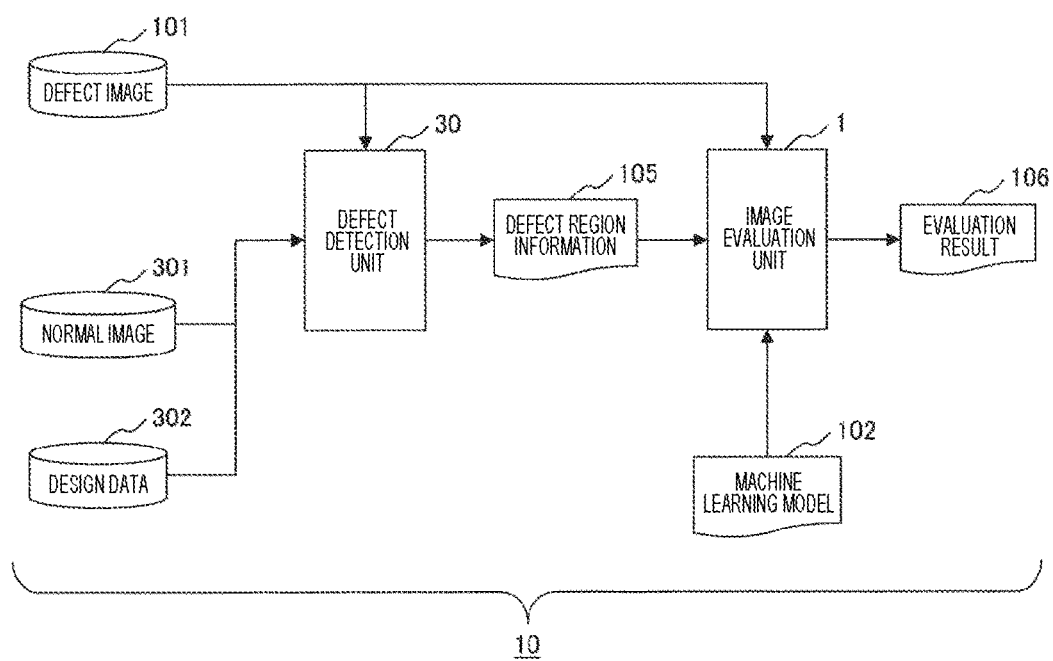
FIG. 4 is a view showing an embodiment of the image evaluation apparatus including a defect detection unit.

In contrast, in the second embodiment, a specific method for obtaining the defect region information 105 will be described with reference to FIG. 4. According to FIG. 4, the image evaluation apparatus 10 includes the defect detection unit 30 to generate the defect region information 105 in an image from the defect image 101 and a normal image 301 or design data 302.

Here, one embodiment of the defect detection unit 30 configured by using the normal image 301 will be described. The normal image 301 is a reference image having the same capturing pattern as that of the defect image 101, but not including a defect object. It is also conceivable to synthesize a plurality of captured images of normal pattern and use the generated image as the normal image 301. The defect detection unit 30 gets the difference between the defect image 101 and the normal image 301, determines a region having a large difference as a defect region, and generates the defect region information 105.

It is also conceivable that by using the contour information such as an edge extracted from the defect image 101, the defect detection unit 30 compares the contour information with the design data 302, detects a defect region caused by the deviation between them, and generates the defect region information 105. Since the normal image 301 is an image obtained when correctly formed in accordance with the design data 302, it can be said to be equivalent to the design data 302.

The second embodiment further relates to the method of creating the defect region information 105 in the configuration of the first embodiment, and is configured as "an image evaluation apparatus including the defect detection unit 30 that detects the defect region information 105 by using the defect image 101 and either one or both of the normal image 301 corresponding to the defect image and the design data 302 corresponding to the defect image, in which the defect region storage unit stores the defect region information 105 from the defect detection unit 30".

Third Embodiment

In the third embodiment, evaluation by creating and comparing a plurality of degree-of-interest images from different viewpoints will be described. It can be said that the defect region information 105 of the first embodiment is replaced with a second degree-of-interest image created from a different viewpoint.

Figure 5:
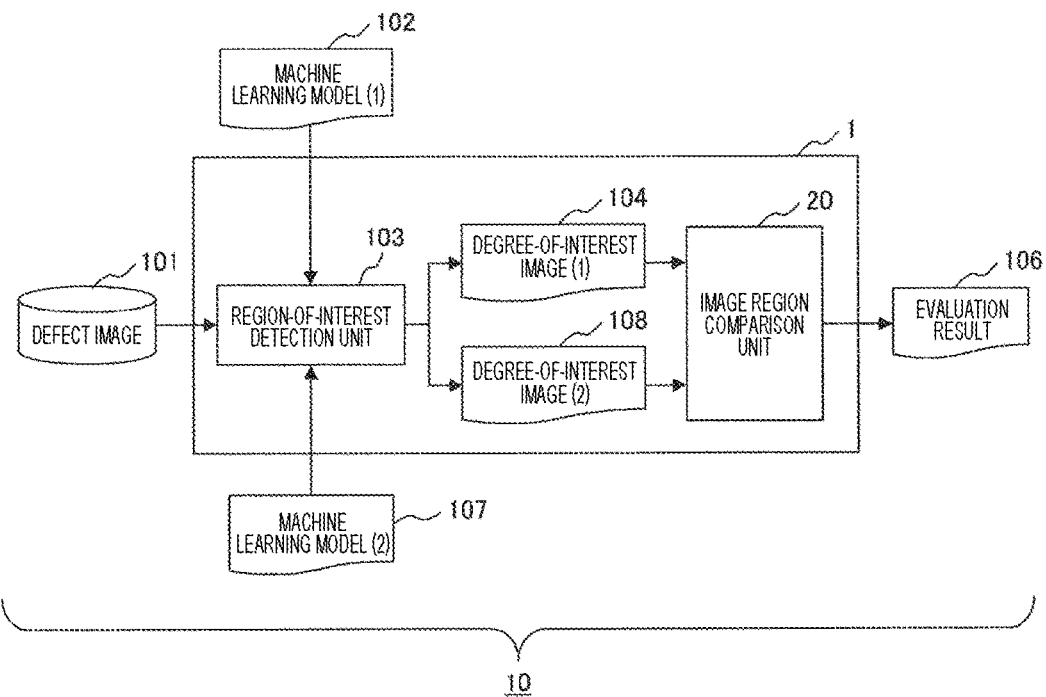
FIG. 5 is a view showing an embodiment of the image evaluation apparatus that compares a plurality of machine learning models.

A schematically presented intermediate product generated by the internal processing function or in the processing process of the image evaluation unit 1 of the third embodiment exemplified in FIG. 5 indicates that the image evaluation unit 1 includes the region-of-interest detection unit 103 that refers to two machine learning models 102 and 107, two detected degree-of-interest images 104 and 108, and the image region comparison unit 20.

The image evaluation unit 1 of FIG. 5 inputs the defect image 101 and the two machine learning models 102 and 107 to the image evaluation unit 1, detects the degree-of-interest images 104 and 108 of each model by the region-of-interest detection unit 103, compares the two degree-of-interest images by the image region comparison unit 20, and outputs the comparison result as the evaluation result 106.

For example, one machine learning model 102 is used as a reference model, and the other machine learning model 107 is used as an evaluation target model. In this case, it is possible to evaluate the level of the performance of the evaluation target model with respect to the performance for which the evaluation result 106 is used as the reference model.

Although the two machine learning models are input to the image evaluation unit 1 in FIG. 5, it is also conceivable for the image evaluation apparatus 10 to input three or more machine learning models, compare each degree-of-interest image, and output the evaluation result 106.

The third embodiment is "an image evaluation apparatus that classifies defect information (type, position, and the like) in a defect image of an electronic device by using the plurality of classifiers (102 and 107) by machine learning, the image evaluation apparatus, including: the image storage unit that stores the defect image 101 of the electronic device; the image extraction unit (103) that extracts a plurality of pieces of image-of-interest information the plurality of classifiers focus on in a process of classification processing of the defect image; and the classifier evaluation unit (20) that evaluates the plurality of classifiers by comparing the plurality of pieces of image-of-interest information (104 and 108)".

Fourth Embodiment

In the first embodiment and the like, the evaluation result is finally obtained and information presentation is performed to the user through, for example, display and the like. However, as described with reference to FIG. 6, in the fourth embodiment, a more accurate machine learning model is constructed by reflecting the evaluation result in the machine learning model.

Figure 6:
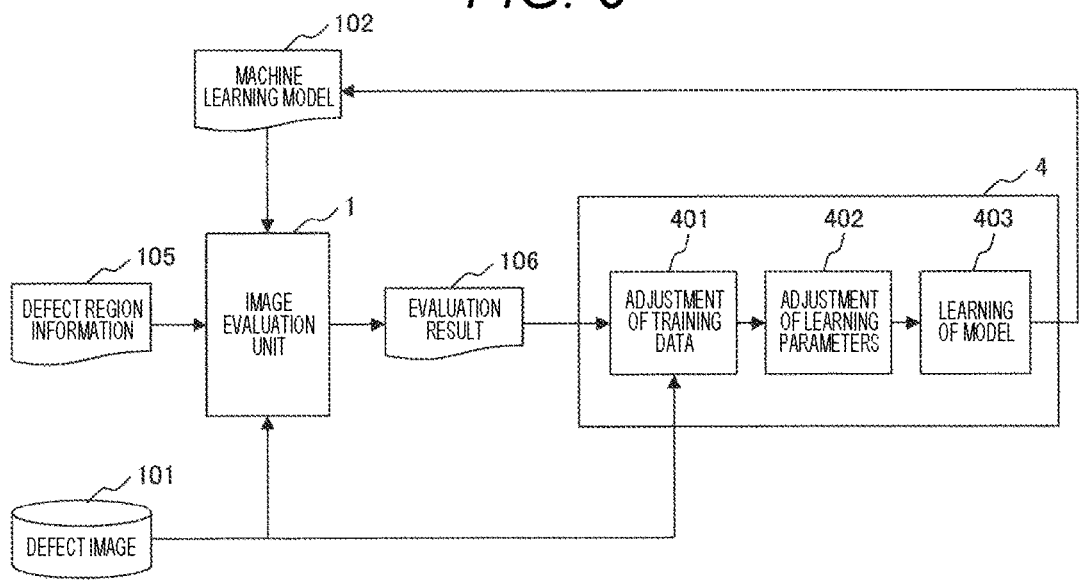
FIG. 6 is a view showing an embodiment of the image evaluation apparatus including a model relearning unit.

FIG. 6 shows an embodiment of the image evaluation apparatus 10 including a function of relearning the machine learning model. In the image evaluation apparatus 10 of FIG. 6, a model relearning unit 4 obtaining learning information of a model by using the evaluation result 106 output by the image evaluation unit 1 is added to adjust the machine learning model 102.

The model relearning unit 4 includes functions of adjustment 401 of training data, adjustment 402 of learning parameter, and learning 403 of model. The model relearning unit first performs the adjustment 401 of training data. For example, in a case where the evaluation result 106 exceeds the threshold value and is detected as an unknown defect image, the unknown defect image is defined as a new defect type. Alternatively, clustering processing is performed on the unknown defect image, and each generated cluster is defined as a new defect type and added to the training data. In a case where the recognition result of the machine learning model 102 and the label value of the image are different and the evaluation result 106 is indicated not to be an unknown defect, there is a possibility of reviewing the label value of the image. For example, suppose that an image whose true value is A is labeled with a label B. In a case where the recognition result is A and the evaluation result 106 indicates that the region of interest of the machine learning model 102 overlaps the defect region, there is a possibility that the label value of this image is wrong.

It is also conceivable to perform the adjustment 402 of learning parameter with reference to the evaluation result 106.

For example, in a case where it is known in advance that the defect image 101 is not an unknown defect but the evaluation result 106 indicates that the defect image 101 is highly likely to be an unknown defect, the penalty of misrecognition for this type of defect image is increased in order to improve the recognition performance of the machine learning model 102. Specifically, the weight of each type used during learning is adjusted. In a case where the deviation between the region of interest the machine learning model 102 focuses on and the defect region is large, the learning is determined as insufficient and an increase in the number of times of learning is also considered.

Relearning of the machine learning model 102 is performed by the learning 403 of model, and the machine learning model 102 to be an input of the image evaluation unit 1 is generated.

Although the model relearning unit 4 of FIG. 6 is depicted as including the adjustment 401 of training data and the adjustment 402 of learning parameter, not both of these two steps are necessary.

In the fourth embodiment, relearning of the machine learning model 102 is performed, an example of it is to adjust the true value of training data, and it is "an image evaluation apparatus including the training data adjustment unit (401) that adjusts training data by a comparison result between the image-of-interest information and the defect region information, and the classifier (102) that performs relearning based on information from the training data adjustment unit".

Alternatively, another example of the fourth embodiment is to adjust the learning parameter, and it is "an image evaluation apparatus including a machine learning parameter adjustment unit that adjusts a machine learning parameter by a comparison result between the image-of-interest information and the defect region information, and the classifier (102) that performs relearning based on information from the machine learning parameter adjustment unit".

Fifth Embodiment

Figure 7:
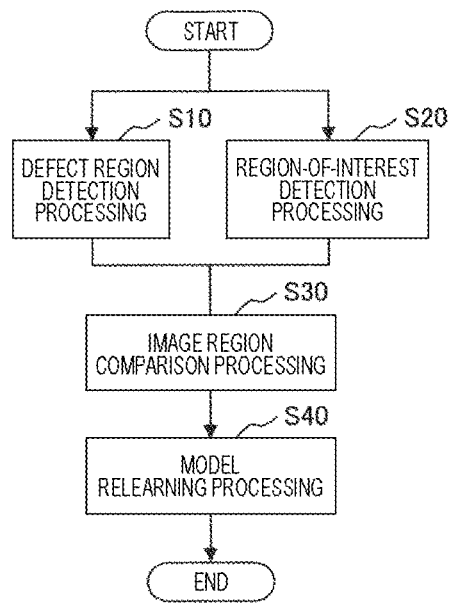
FIG. 7 is a view showing an embodiment of a processing flow of an image evaluation method.

The fifth embodiment shown in FIG. 7 is a flowchart describing a series of processing content in the image evaluation method of the present invention.

According to this processing flow, the defect region detection processing shown in the processing step S10 and the region-of-interest detection processing shown in the processing step S20 are executed in parallel, and, at a stage where both processing results are given, the next processing step S30 is executed to perform image region comparison processing. Thereafter, model relearning processing (in a case of the fourth embodiment) is performed in the processing step S40.

The processing other than the region-of-interest detection processing S20 and the image region comparison processing S30 are optional steps. A part of or the entire the processing of the image evaluation method described above may be created by a processing program that operates on a general-purpose CPU. It is also conceivable to cause a dedicated LSI or FPGA to perform a part of or the entire processing.

The fifth embodiment as an image evaluation method is "(the entire system including) the image evaluation method (1) of classifying defect information (type, position, and the like) in a defect image of an electronic device by using the classifier (102) by machine learning, the image evaluation method, including: storing (101) a defect image of the electronic device; storing (105) defect region information in the defect image; extracting (103 and 104) image-of-interest information the classifier focuses on in a process of classification processing of the defect image; and evaluating (20) classifiability of the defect image by comparing the image-of-interest information with the defect region information".

It is also conceivable to discriminate whether or not the defect image 101 is an unknown defect with the output value calculated by the model 102. For example, in a case where the model 102 is an image classification model, a probability value belonging to each class is output, and if even its highest probability is smaller than the threshold value, the defect image 101 is discriminated as an unknown defect. However, according to the literature "Nguyen, Anh, Jason Yosinski, and Jeff Clune. "Deep neural networks are easily fooled: High confidence predictions for unrecognizable images." Proceedings of the IEEE Conference on Computer Vision and Pattern Recognition. 2015", in many cases, the probability value output by a model tends to be too high. Therefore, the performance of the unknown defect discrimination by the threshold value is not improved.

Many existing methods use a constraint condition that the sum of probability values belonging to each class becomes 1.0 by Softmax function. Then, a probability value belonging to a certain class is affected by a probability value belonging to another class. Therefore, the probability value becomes not an absolute probability value belonging to a certain class but a relative probability value of all learning classes. It is difficult for the threshold value processing of relative probability to perform discrimination of an unknown defect. For example, an image of a cat is recognized with a three-class classification task of "bird, tiger, and fish". Since the cat is different from any of the three classes, all the three probabilities become low in the case of absolute probability. In the case of relative probability, however, among the three classes, the cat is relatively similar to the tiger, and hence the probability value of belonging to the tiger becomes high. In this case, it is difficult to recognize the cat as an unknown class by the threshold value processing.

Figure 12:
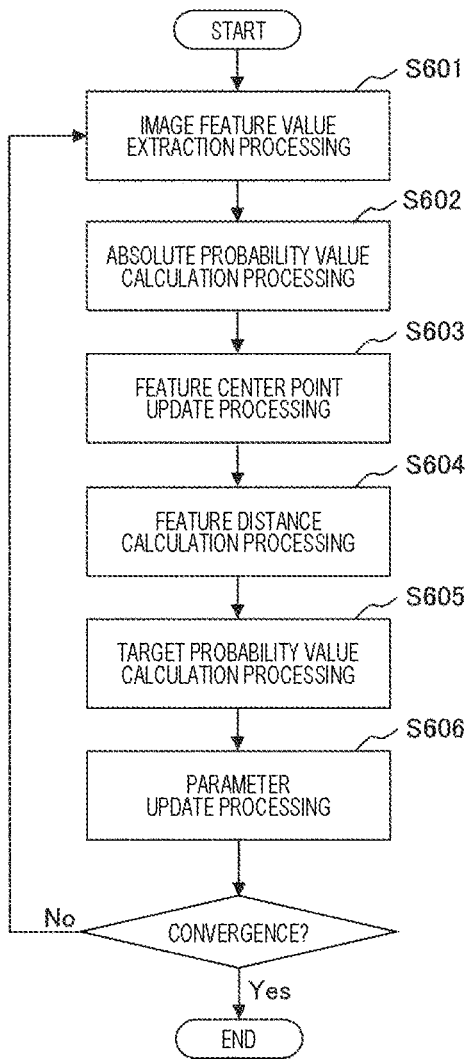
FIG. 12 is a view showing a learning method of a machine learning model.

In order to solve the above problem, a model learning method as shown in FIG. 12 is proposed. First, in step S601, the feature values are extracted from the image. Using the extracted feature values, a probability value belonging to each class is calculated in step S602. This probability value is an absolute probability value and indicates the possibility of belonging to the corresponding class. Then, in step S603, the feature center point of the true value class of the corresponding image is updated. Thereafter, in step S604, the distance from the feature values of the corresponding image to the feature center point of each class is calculated. Using this distance, a target probability value of each class is calculated in step S605.

Finally, in step S606, the parameter of the model is updated so that the probability value calculated in step S602 approaches the target probability value. Until the convergence condition of the learning is satisfied, the model is learned by repeating steps S601 to S606.

In the above description, step S603 for updating the feature center point is called before executing step S604 for calculating the distance between the feature values of the image and the feature center point. However, step S603 may be placed after step S604. Alternatively, it is also conceivable to execute step S603 after performing steps S604 to S606 a plurality of times.

An embodiment of the image feature value extraction step S601 includes a multilayer neural network. Alternatively, human-designed feature values are also conceivable. Basically, multidimensional image feature values are extracted.

As an embodiment of step S602 for calculating the absolute probability value, the multidimensional image feature values are converted into one dimension by a regression method such as multiple regression analysis or support vector regression, and further converted into a range of 0.0 to 1.0 by a logistic function such as sigmoid. It is also conceivable that the multidimensional image feature values are converted into one-dimensional values by a neural network.

As an embodiment of step S603, the difference between the image feature values and the feature center point of the true value class is calculated, the difference is multiplied by a coefficient, and then added to the current feature center point. The coefficient multiplied by the difference may be a parameter set by the user or a value automatically determined by the number of samples of the true value class.

Using the distance to the feature center point of each class calculated in step S604, the target probability value of each class is calculated in step S605. The greater the distance becomes, the smaller the target probability value becomes. For example, an exponential function of distance is conceivable. Many existing methods use a one-hot vector with a target probability value such as "true value class of 1.0 and non-true value class of 0.0".

In the present invention, not one hot but a value in consideration of the distance to the feature center point is used as the target probability value. In order to reduce the calculation amount, it is conceivable to set a target value other than the true value class to zero or a predetermined value.

It has been explained that when a defect image is evaluated, whether or not the defect image is an unknown defect is discriminated by the probability value calculated by the model and the threshold value. However, it is also conceivable that whether or not the defect image is an unknown defect is discriminated by the size of the distance between the image feature values extracted by the model and the feature center point of each class. Alternatively, it is also possible that the image region comparison unit 20 discriminates whether or not to be an unknown defect after multiplying the probability value output by the model as a coefficient by the degree-of-interest image 104.

REFERENCE SIGNS LIST 1 image evaluation unit
20 image region comparison unit
30 defect detection unit
40 model relearning unit
5 evaluation result display unit
101 defect image
102, 107 machine learning model
103 region-of-interest detection unit
104, 108 degree-of-interest image
105 defect region information
106 evaluation result
201 threshold value processing
202 center calculation
203 center distance calculation
204 center distance
205 rectangle calculation
206 rectangle multiplicity degree calculation
207 rectangle multiplicity degree
301 normal image
302 design data
401 adjustment of training data
402 adjustment of learning parameter
403 learning of model
S10 defect region detection processing
S20 region-of-interest detection processing
S30 image region comparison processing
S40 model relearning processing
S601 image feature value extraction processing
S602 absolute probability value calculation processing
S603 feature center point update processing
S604 feature distance calculation processing
S605 target probability value calculation processing
S606 parameter update processing

The invention claimed is:

1. An image evaluation apparatus that classifies defect information in a defect image of an electronic device by using a classifier by machine learning, the image evaluation apparatus, comprising:
a hardware processor; and
a non-transitory computer-readable medium operatively coupled with the hardware processor, and storing the defect image of the electronic device and program instructions executed by the hardware processor that cause the image evaluation apparatus to:
store defect region information in the defect image;
classify, by the classifier, the defect information via the machine learning based on image-of-interest information of the defect image;
extract the image-of-interest information; and
evaluate classifiability of the defect image by comparing the image-of-interest information with the defect region information and determine an evaluation result including a center distance between a center of the image-of-interest and a center of the defect region, or a rectangle multiplicity degree indicating a ratio of an overlap region, in which the region of interest and the defect region overlap each other, to a total region.

2. The image evaluation apparatus according to claim 1, wherein the program instructions executed by the hardware processor further cause the image evaluation apparatus to:
detect the defect region information by using the defect image and either one or both of a normal image corresponding to the defect image and design data corresponding to the defect image.

3. The image evaluation apparatus according to claim 1, wherein the program instructions executed by the hardware processor further cause the image evaluation apparatus to:
adjust training data by a comparison result between the image-of-interest information and the defect region information; and
the classifier performs relearning based on adjusted training data.

4. The image evaluation apparatus according to claim 1, wherein the program instructions executed by the hardware processor further cause the image evaluation apparatus to:
adjust a machine learning parameter by a comparison result between the image-of-interest information and the defect region information; and
the classifier performs relearning based on an adjusted machine learning parameter.

5. The image evaluation apparatus according to claim 1, further comprising:
an image display screen that displays an evaluation result of the classifiability of the defect image.

6. The image evaluation apparatus according to claim 5, wherein the image display screen displays defect region information in the defect image.

7. The image evaluation apparatus according to claim 6, wherein the image display screen displays at least one or more of a normal image corresponding to the defect image and design data corresponding to the defect image.

8. The image evaluation apparatus according to claim 1, wherein the hardware processor calculates one or more coordinates of interest from an image region the classifier focuses on, calculates one or more defect coordinates from the defect region information, compares distances between coordinates, and evaluates classifiability of the defect image.

9. The image evaluation apparatus according to claim 1, wherein the hardware processor calculates a representative area of interest from an image region the classifier focuses on, calculates a defect area from the defect region information, calculates multiplicity between areas, and evaluates classifiability of the defect image.

10. An image evaluation apparatus that classifies defect information in a defect image of an electronic device by using a plurality of classifiers by machine learning, the image evaluation apparatus, comprising:
a hardware processor; and
a non-transitory computer-readable medium operatively coupled with the hardware processor, and storing the defect image of the electronic device and program instructions executed by the hardware processor that cause the image evaluation apparatus to:
classify, by the plurality of classifiers, the defect information via the machine learning based on image-of-interest information of the defect image;
extract a plurality of pieces of image-of-interest information; and
evaluate the plurality of classifiers by comparing the plurality of pieces of image-of-interest information and determine an evaluation result including a center distance between a center of a first piece of the image-of-interest information that is created from a first viewpoint and a center of a second piece of the image-of-interest information, which is created from a second viewpoint that is different from the first viewpoint, or a rectangle multiplicity degree indicating a ratio of an overlap region, in which the first piece of the image-of-interest information and the second piece of the image-of-interest information overlap each other, to a total region.

11. An image evaluation method of classifying defect information in a defect image of an electronic device by using a classifier by machine learning, the image evaluation method, comprising:
storing the defect image of the electronic device;
storing defect region information in the defect image;
classifying, by the classifier, the defect information based on image-of-interest information of the defect image;
extracting the image-of-interest information; and
evaluating classifiability of the defect image by comparing the image-of-interest information with the defect region information and determining an evaluation result including a center distance between a center of the image-of-interest and a center of the defect region, or a rectangle multiplicity degree indicating a ratio of an overlap region, in which the region of interest and the defect region overlap each other, to a total region.

12. The image evaluation method according to claim 11, wherein defect region information is detected by using the defect image and either one or both of a normal image corresponding to the defect image and design data corresponding to the defect image, and the defect region information is stored.

13. The image evaluation method according to claim 11, wherein
training data is adjusted by a comparison result between the image-of-interest information and the defect region information, and
the classifier performs relearning based on information from the adjusted training data.

14. The image evaluation method according to claim 11, wherein a machine learning parameter is adjusted by a comparison result between the image-of-interest information and the defect region information, and the classifier performs relearning based on information from the adjusted machine learning parameter.

15. The image evaluation method according to claim 11, wherein the evaluation result is displayed.

16. An image evaluation method of classifying defect region information in a defect image of an electronic device by using a plurality of classifiers by machine learning, the image evaluation method, comprising:
storing the defect image of the electronic device;
classifying, by the plurality of classifiers, the defect region information based on image-of-interest information of the defect image;
extracting a plurality of pieces of image information; and
evaluating the plurality of classifiers by comparing the plurality of pieces of image-of-interest information and determining an evaluation result including a center distance between a center of a first piece of the image-of-interest information that is created from a first viewpoint and a center of a second piece of the image-of-interest information, which is created from a second viewpoint that is different from the first viewpoint, or a rectangle multiplicity degree indicating a ratio of an overlap region, in which the first piece of the image-of-interest information and the second piece of the image-of-interest information overlap each other, to a total region.

* * * * *